(12) United States Patent
Kirkland et al.

(10) Patent No.: US 7,475,110 B2
(45) Date of Patent: Jan. 6, 2009

(54) METHOD AND INTERFACE FOR MULTI-THREADED CONVERSATIONS IN INSTANT MESSAGING

(75) Inventors: Dustin C. Kirkland, Austin, TX (US); Richard James McCarty, Austin, TX (US); Herman Rodriguez, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 883 days.

(21) Appl. No.: 10/752,917

(22) Filed: Jan. 7, 2004

(65) Prior Publication Data

US 2005/0149621 A1    Jul. 7, 2005

(51) Int. Cl.
*G06F 15/16* (2006.01)

(52) U.S. Cl. .................................................... 709/204

(58) Field of Classification Search ................ 709/205, 709/206, 207, 204
See application file for complete search history.

(56) References Cited

U.S. PATENT DOCUMENTS

| | | | |
|---|---|---|---|
| 5,617,541 A | | 4/1997 | Albanese et al. |
| 5,995,940 A | | 11/1999 | Ramaley |
| 6,212,548 B1 | * | 4/2001 | DeSimone et al. ........... 709/204 |
| 6,301,609 B1 | * | 10/2001 | Aravamudan et al. ....... 709/207 |
| 6,392,997 B1 | | 5/2002 | Chen |
| 6,484,196 B1 | * | 11/2002 | Maurille ..................... 709/206 |
| 6,493,703 B1 | * | 12/2002 | Knight et al. .................. 707/3 |
| 6,510,458 B1 | | 1/2003 | Berstis et al. |
| 6,557,027 B1 | * | 4/2003 | Cragun ....................... 709/204 |
| 6,594,693 B1 | * | 7/2003 | Borwankar ................. 709/219 |
| 6,778,941 B1 | | 8/2004 | Worrell et al. |
| 6,832,245 B1 | * | 12/2004 | Isaacs et al. ................ 709/206 |
| 6,961,720 B1 | | 11/2005 | Nelken |
| 6,964,040 B2 | | 11/2005 | Osborn |
| 6,981,223 B2 | | 12/2005 | Becker et al. |
| 7,007,085 B1 | | 2/2006 | Malik |
| 7,016,978 B2 | | 3/2006 | Malik et al. |
| 7,039,677 B2 | * | 5/2006 | Fitzpatrick et al. .......... 709/204 |
| 7,099,855 B1 | | 8/2006 | Nelken et al. |

(Continued)

OTHER PUBLICATIONS

U.S. Appl. No. 10/427,137, Gusler et al., Method Apparatus for Enhancing Instant Messaging Systems, Apr. 30, 2003.

(Continued)

*Primary Examiner*—Michael Won
(74) *Attorney, Agent, or Firm*—Duke W. Yee; Jeffrey S. LaBaw; Cathrine K. Kinslow

(57) ABSTRACT

A method, apparatus, and computer instructions for managing multi-threaded conversations in an instant messaging system. The present invention provides a menu option to allow the start of a new topic of discussion within the current instant messaging session. When a new topic is selected, a new thread of conversation is created within the messaging window that is segregated from previous topics of discussion. This new thread of conversation may be created at all other locations for all of the parties involved in the instant messaging session. In this manner, each party to a messaging session containing multiple conversations may be able to understand which response is related to which thread of conversation. In addition, a menu option may be provided by the instant messaging application to allow a user to merge one or more of the threaded conversations into a single conversation.

10 Claims, 4 Drawing Sheets

U.S. PATENT DOCUMENTS

| | | | |
|---|---|---|---|
| 7,121,003 B2 | 10/2006 | Yasumura et al. | |
| 7,124,123 B1 | 10/2006 | Roskind et al. | |
| 7,124,372 B2 | 10/2006 | Brin | |
| 7,142,664 B2 | 11/2006 | Seligmann | |
| 7,174,453 B2* | 2/2007 | Lu | 713/154 |
| 7,185,057 B2* | 2/2007 | Brown et al. | 709/206 |
| 7,200,634 B2* | 4/2007 | Mendiola et al. | 709/204 |
| 7,200,635 B2* | 4/2007 | Yashchin et al. | 709/206 |
| 2001/0003202 A1* | 6/2001 | Mache et al. | 713/153 |
| 2002/0007398 A1* | 1/2002 | Mendiola et al. | 709/206 |
| 2002/0082484 A1 | 6/2002 | Baba et al. | |
| 2002/0083134 A1 | 6/2002 | Bauer, Jr. et al. | |
| 2002/0087649 A1 | 7/2002 | Horvitz | |
| 2003/0009495 A1 | 1/2003 | Adjaoute | |
| 2003/0018726 A1* | 1/2003 | Low et al. | 709/206 |
| 2003/0023684 A1* | 1/2003 | Brown et al. | 709/204 |
| 2003/0046421 A1 | 3/2003 | Horvitz et al. | |
| 2003/0131055 A1* | 7/2003 | Yashchin et al. | 709/204 |
| 2003/0131064 A1* | 7/2003 | Bell et al. | 709/206 |
| 2004/0024822 A1* | 2/2004 | Werndorfer et al. | 709/206 |
| 2004/0039786 A1 | 2/2004 | Horvitz et al. | |
| 2004/0078445 A1 | 4/2004 | Malik | |
| 2004/0143636 A1 | 7/2004 | Horvitz et al. | |
| 2004/0158610 A1 | 8/2004 | Davis et al. | |
| 2004/0181577 A1* | 9/2004 | Skurikhin et al. | 709/204 |
| 2005/0108332 A1* | 5/2005 | Vaschillo et al. | 709/206 |
| 2005/0228864 A1 | 10/2005 | Robertson | |
| 2006/0248150 A1* | 11/2006 | Chaar et al. | 709/206 |

OTHER PUBLICATIONS

Not Assigned, Kirkland et al., Instant Messaging Priority Filtering Based on Content and Hierarchical Schemes, Jan. 7, 2004.

Not Assigned, Kirkland et al., Instant Messaging Windowing for Topic Threads, Jan. 7, 2004.

* cited by examiner

| | |
|---|---|
| Josh | hey, how do you recursively search for a file in Linux? |
| Dustin | for a file, or in a file? |
| Josh | in a file |
| Dustin | use grep-r |
| Josh | what about the software deal? |
| Dustin | or if you're searching for a file, use "find." |
| Dustin | still working on it |
| Josh | are we gonna lose it? |
| Josh | find. is recursive? |
| Dustin | yes |
| Josh | did we win the game last night? |
| Dustin | I mean, yes, find is recursive. And hopefully we won't lose the deal! |
| Dustin | we lost :( |

*FIG. 6*

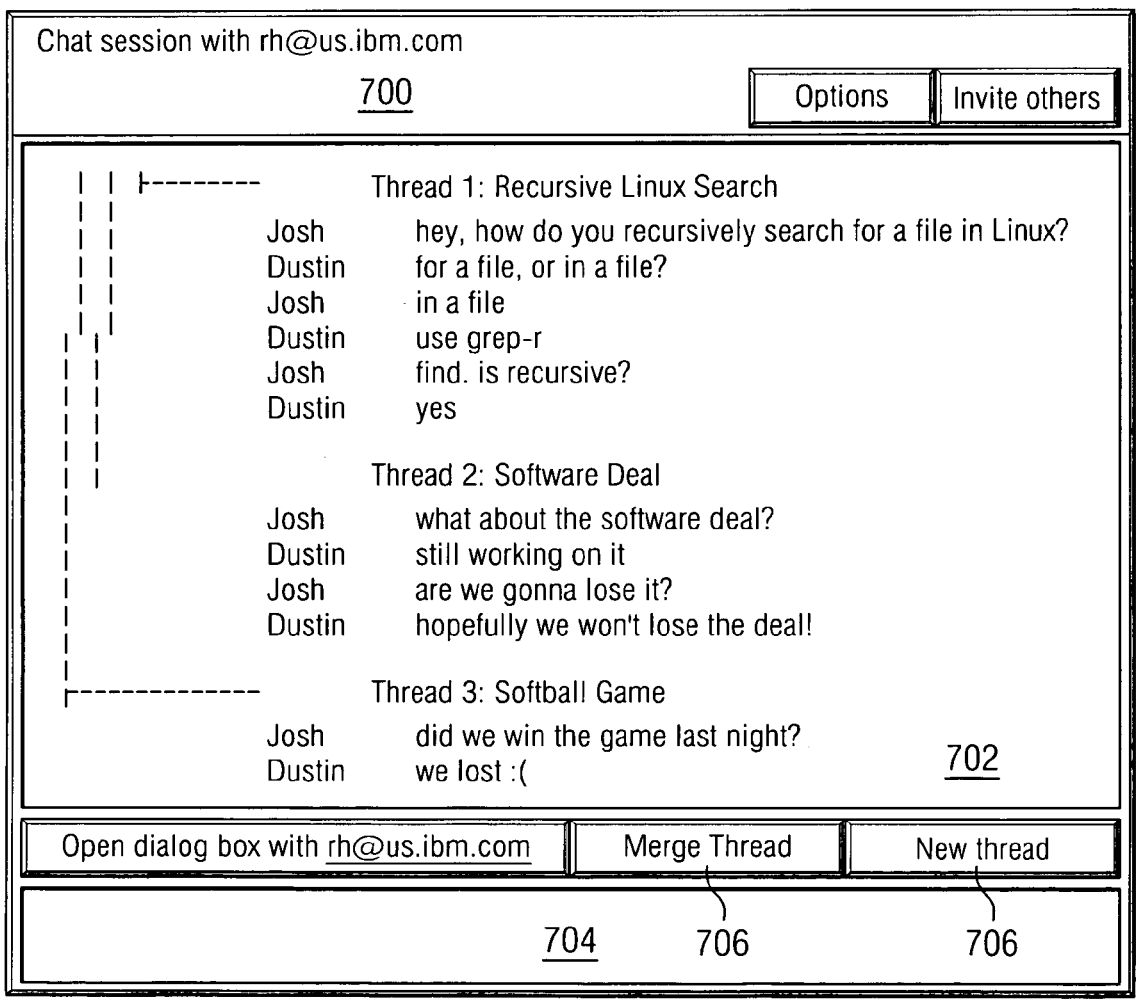

*FIG. 7*

METHOD AND INTERFACE FOR MULTI-THREADED CONVERSATIONS IN INSTANT MESSAGING

CROSS REFERENCE TO RELATED APPLICATIONS

The present invention is related to applications entitled "Method and Apparatus for Enhancing Instant Messaging Systems", Ser. No. 10/427,137, filed on Apr. 10, 2003; "Instant Messaging Windowing for Topic Threads", Ser. No. 10/752,804, filed on Jan. 7, 2004; and "Instant Messaging Priority Filtering Based on Content and Hierarchical Schemes", Ser. No. 10/752,919, filed on Jan. 7, 2004. The above related applications are assigned to the same assignee, and incorporated herein by reference.

BACKGROUND OF THE INVENTION

1. Technical Field

The present invention relates generally to an improved data processing system and in particular, to a method, apparatus, and computer instructions for processing and displaying messages. Still more particularly, the present invention provides an improved method, apparatus, and computer instructions for managing multi-threaded conversations in instant messaging systems.

2. Description of Related Art

Instant messaging is an online chat medium, allowing users to communicate with each other and to collaborate in real-time over a network data processing system. Instant messaging is commonly used over the Internet. Instant messaging applications monitor and report the status of users that have established each other as online contacts. This information is typically presented to a user in a window. Instant messaging applications also are often used by users conducting business. By utilizing instant messaging, business users can view each other's availability and initiate a text conversation with colleagues or customers when a desired contact becomes available. Millions of users communicate using instant messaging systems every day. With instant messaging becoming an important part of both personal and business communications, functionality and usability enhancements are important to the continued success of this type of communication tool.

Presently available instant messaging applications, however, include flaws which should be corrected for these applications to continue to be popular as a communications mechanism. One flaw recognized by the present invention is synchronicity. Multiple topics may be discussed in an instant messaging session. Since it takes time for a user to enter or type a message, a user's reply to a first message may not be transmitted until after a second message is sent to the user. For example, if user A asks user B a question, user B will begin to respond to user A's question. User A might then ask another question, or make another statement before user B's response to the first question has been transmitted. When user B eventually sends a response, it may be unclear to user A which line of conversation user B was addressing in the response.

Additionally, the present invention recognizes that the current messaging programs are limited in organizing conversational threads in a topical manner. Currently, instant messing programs represent multiple conversations as one stream of conscious conversation. As a result, a user must attempt to understand what response is related to what thread of conversation. However, in some situations, it may not be possible to do so.

Therefore, it would be advantageous to have an improved method, apparatus, and computer instructions for managing multi-threaded conversations in an instant messaging system.

SUMMARY OF THE INVENTION

The present invention provides a method, apparatus, and computer instructions for managing multi-threaded conversations in an instant messaging system. The present invention provides a menu option to allow the start of a new topic of discussion within the current instant messaging session. When a new topic is selected, a new thread of conversation is created within the messaging window that is segregated from previous topics of discussion. This new thread of conversation may be created at all other locations for all of the parties involved in the instant messaging session. In this manner, each party to a messaging session containing multiple conversations may be able to understand which response is related to which thread of conversation.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is an example of messages in an ongoing conversation pane in accordance with the prior art;

FIG. 7 is a diagram illustrating an example of a messaging window in accordance with a preferred embodiment of the present invention.

DETAILED DESCRIPTION OF THE PREFERRED EMBODIMENT

Figure 1:
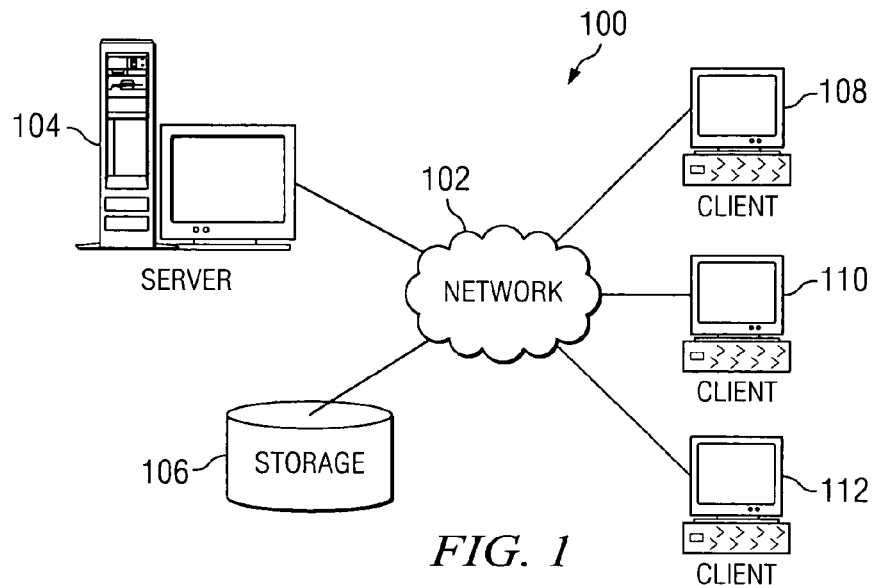
FIG. 1 depicts a representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers or personal digital assistants (PDAs). In the depicted example, server 104 provides data, such as boot files, operating system images, and applications to clients 108-112. Clients 108, 110, and 112 are clients to server 104. Server 104 may act as an instant messaging server to facilitate the exchange of messages between users at clients, such as clients 108, 110, and 112. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
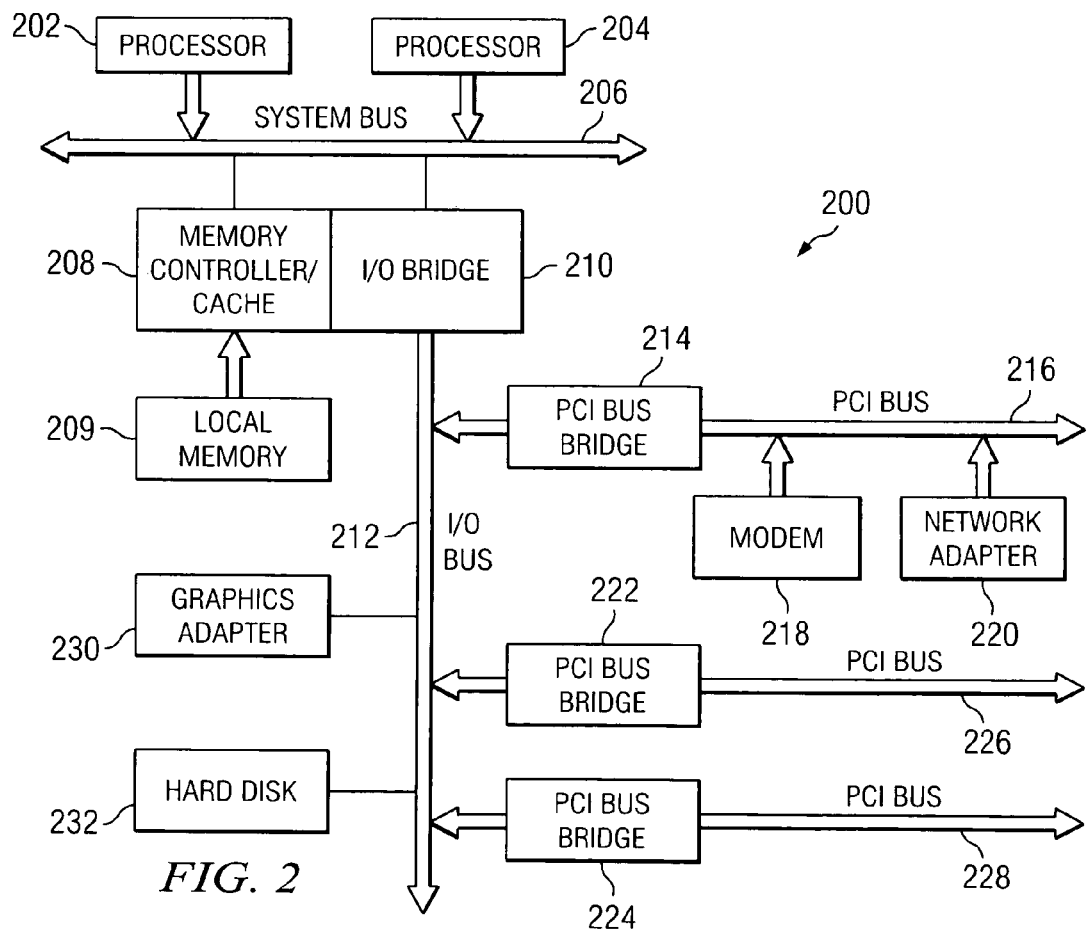
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
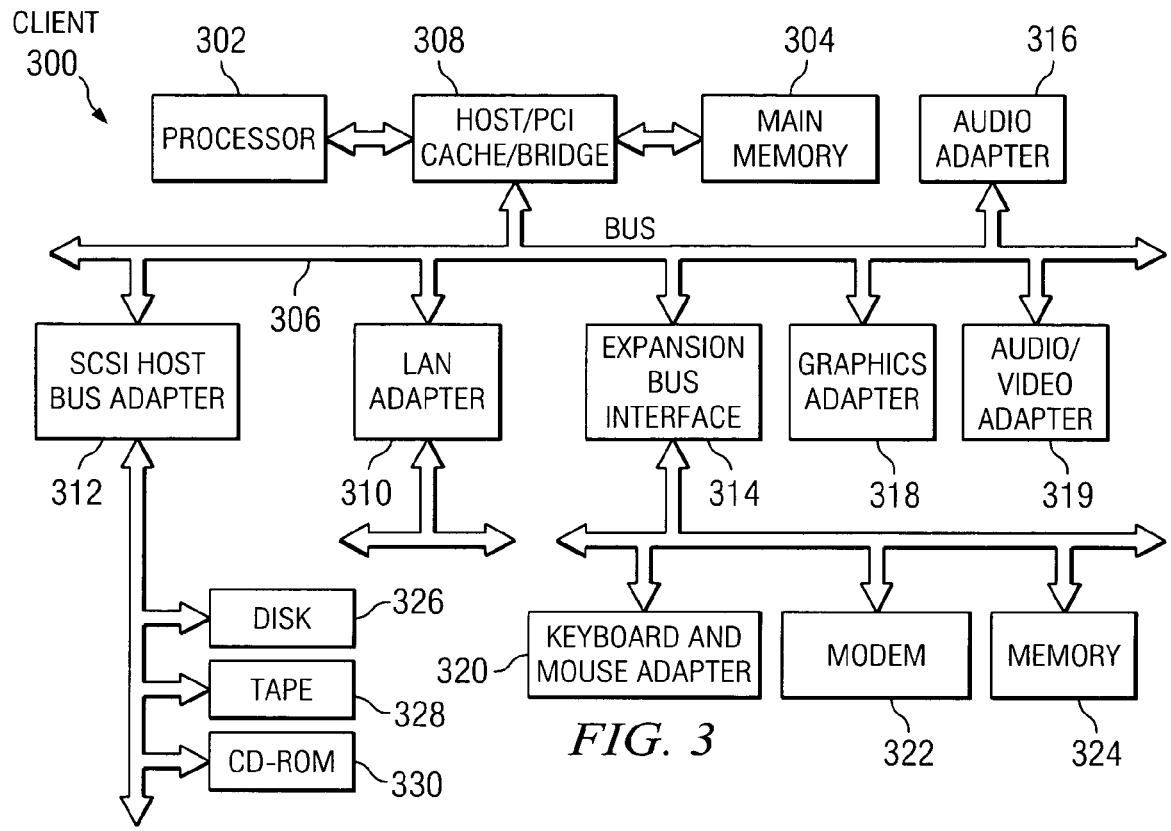
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for managing multi-threaded conversations in an instant messaging system. The present invention overcomes problems associated with chronological messaging digests by managing multi-topical conversations within a single messaging window of an instant messaging session so as to allow communication to proceed more clearly. The mechanism of the present invention provides a menu option to allow the start of a new topic of discussion within the current instant messaging session. When a new topic is selected, a new thread of conversation is created within the messaging window that is segregated from the previous topic of discussion. This new thread of conversation may be created at all other locations for all of the parties involved in the instant messaging session. In this manner, each party to a messaging session containing multiple conversations may be able to understand which response is related to which thread of conversation. In addition, a menu option may be provided by the instant messaging application to allow a user to merge one or more of the threaded conversations into a single conversation.

Figure 4:
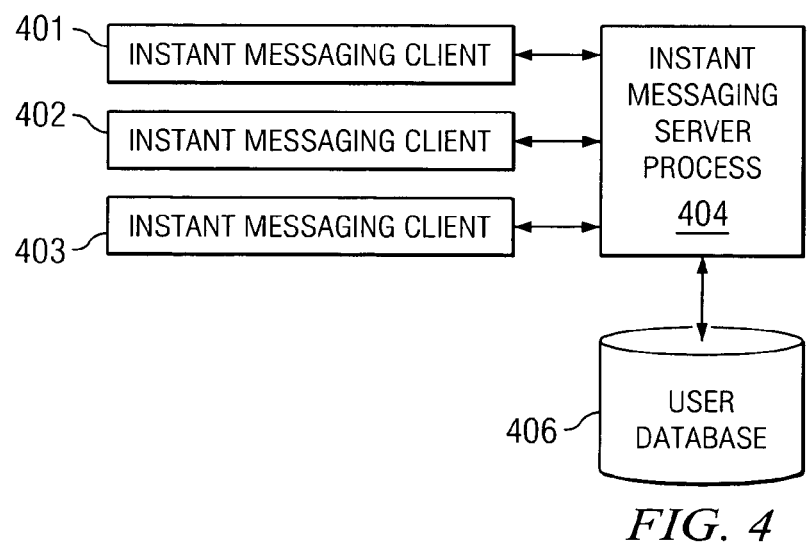
FIG. 4 is a block diagram illustrating components used in managing messages in accordance with a preferred embodiment of the present invention.

Turning now to FIG. 4, a block diagram illustrating components used in an instant messaging system in accordance with a preferred embodiment of the present invention is shown. In this illustrative example, a user at instant messaging client 401 may send or exchange messages with other users at instant messaging clients 402 and 403. These instant messaging clients may be executing on a data processing system, such as data processing system 300 in FIG. 3. The exchange of messages in these examples is facilitated through instant messaging server process 404. This process allows for users to find other users within the instant messaging system as well as aid in the exchange of messages between different users.

Depending on the particular instant messaging system, instant messaging server process 404 may only be involved in providing an indication of when particular users are online and for establishing initial contacts while users contacting users already on a buddy list may contact those users directly after seeing that a particular user is online. Instant messaging server process 404 may be located on a server, such as data processing system 200 in FIG. 2.

In these examples, the different users registered to the instant messaging system are stored in user database 406. This user database provides information needed to search for and find other users as well as contact users when they are online.

Figure 5:
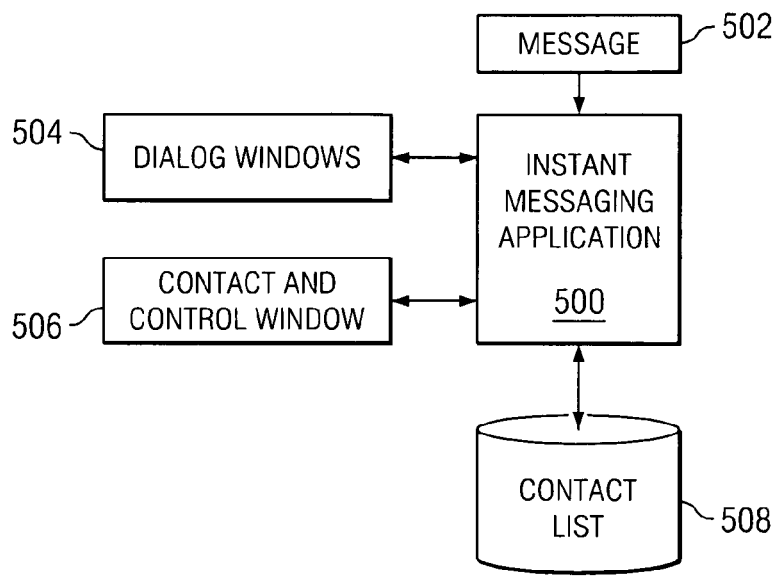
FIG. 5 is a diagram illustrating an instant messaging client in accordance with a preferred embodiment of the present invention.

Turning next to FIG. 5, a diagram illustrating an instant messaging client is depicted in accordance with a preferred embodiment of the present invention. The components illustrated in FIG. 5 may be found in an instant messaging client, such as instant messaging client 401, 402, or 403 in FIG. 4. These components may be implemented in a data processing system, such as data processing system 300 in FIG. 3.

In the illustrative example, instant messaging application 500 processes messages, such as message 502, received from users located on remote data processing systems. As messages are received, these messages are presented in dialog windows 504. Additionally, dialog windows 504 provide an interface for a user to input text to send messages to other users.

Contact and control window 506 is presented by instant messaging application 500 to provide the user with a list of user names, as well as other information. Contact and control window 506 also provides an interface to allow a user to set different preferences. For example, the user may set passwords required to access different names used in instant messaging sessions.

Also, a user may employ contact and control window 506 to set other preferences, such as colors and fonts used in instant messaging application 500. These preferences also may include whether a picture is to be sent when a session is initiated with another user. Depending on the implementation, the preference may be set to allow a user who receives messages to retrieve images of the senders from a remote database or a local cache.

Further, a list of names presented by contact and control window 506 are stored in contact list 508 in these examples. Additional user or screen names may be added to or deleted from contact list 508. This contact list is employed in presenting the list of names within contact and control window 506.

A user may select a menu option to initiate a new topic of conversation within the current messaging session. When a message containing this new topic of conversation is sent to other parties involved in the session, a new thread of conversation is created in the messaging window for each party. The new thread of conversation may be created by passing additional information with the actual message, such as within the message header. For example, a "conversation ID" or "conversation title" field may be appended to the message header. The instant messaging client may then read the value within the field and display the message in the appropriate conversation window, thread, or sub-tree structure associated with the value in the field. Thus, the previous topic of conversation and the new topic of conversation are segregated in order to organize the different conversations in a topical manner.

With reference now to FIG. 6, a diagram illustrating a conversation format currently used in instant messaging applications is depicted. In this example, a conversation is being conducted between two parties, Josh and Dustin. The parties are discussing multiple topics of conversation, although the conversation format of the messaging window simply represents these multiple conversations as one stream of conscious conversation. As can be seen, this lack of topical organization of conversation requires that the users must attempt to understand what response is related to what thread of conversation. However, in some situations like the one shown in FIG. 6, it may not be possible to do so.

Turning next to FIG. 7, a diagram of a messaging window for providing enhanced instant messaging thread control is depicted in accordance with a preferred embodiment of the present invention. In this example, messaging window 700 is an example of a messaging window within dialog windows 504 in FIG. 5. Messaging window 700 is presented for purposes of illustration and not meant as a limitation as to how messages may be presented. Messaging window 700 is displayed when a message is received from another user.

Ongoing conversation pane 702 contains all messages for the current messaging session. Outgoing message pane 704 contains input from the user that is sent to other users at remote data processing systems. Outgoing message pane 704 is used to hold a current reply, but is emptied as soon as that reply is sent to the recipient. According to the present invention, a menu option such as new thread button 706 is included to allow for the management of more than one thread within a messaging session.

When a party to the messaging session starts a new topic of conversation in outgoing message pane 704, the party may send the message by selecting a menu option, such as new thread button 706. By selecting the new thread button, a new topic of conversation is initiated in messaging window 700, such that the new message in the messaging window is segregated from prior topics of conversation. For example, using the conversations shown in FIG. 6, when the user, Josh, initiates the new topic of conversation regarding a software deal, Josh's message "What about the software deal?" may be split from the recursive Linux search conversation and presented to each user as a separate thread of conversation, as shown in ongoing conversation pane 702 in FIG. 7.

Although the example in FIG. 7 illustrates displaying the separated threads in a tree-like hierarchical format which allows for n-deep subdiscussions as different topics are discussed, it should be noted that any manner of presenting the segregated conversations may be used. As each party receives a message containing a new topic of conversation, ongoing conversation pane 702 of each user's display is organized such that each thread of conversation is separated from other threads of conversation. A user may also merge the threaded display of the messaging session into a chronological conversational format using a menu option, such as merge thread button 708. In this manner, a user may expand the display of the ongoing conversation to view the conversation in a topical format, or merge the display to view the conversation in chronological order.

In addition, the user may expand or collapse each thread of discussion separately, so that the messages in a thread in ongoing conversation page 702 are viewable or hidden, respectively. For example, if a user only wants to view the "Thread 2: Software Deal" messages as shown in FIG. 7, the user may collapse the other threads of discussion. In this manner, the messages for "Thread 1: Recursive Linux Search" and "Thread 3: Softball Game" are hidden from view, and only the threaded topic names remain viewable. If, at a later time, the user wants to view the conversation in a collapsed thread of discussion, the user may expand the topic of discussion to view the messages. Expanding or collapsing discussion threads may be performed by selecting a menu option or double-clicking on the threaded topic name.

As can be seen, the window mechanism of the present invention illustrated in FIG. 7 provides an ability to separate different conversations within a messaging session into different threads. In these examples, when new thread button 706 is selected, this results in a message being sent to the other instant messaging program on the remote data processing system to create a new thread for the new topic of conversation. Of course, any number of other threads may be created for other topics of conversation, even though only three conversation threads are illustrated in FIG. 7.

Furthermore, separate topics of conversation, or subthreads, may be created within an existing thread. The present invention allows for subdiscussions to take place within an existing thread of conversation. For instance, a user may initiate a conversation under a broad topic or parent thread, such as "business". The user may send messages related to business matters, which will be displayed within a "business" conversation thread. However, a user may also create subthreads of conversation within an existing parent thread. For example, if the user selected the new thread menu option within the "Recursive Linux Search" and the "Software Deal" discussions shown in FIG. 7, these subtopics of conversation would be displayed within the "business" parent conversation thread. The "new thread" button starts an entirely new conversation thread, the user may select the "new thread" option and a different parent button, or highlight the parent thread to indicate that a new thread is started in an existing conversation. In this manner, a user may first organize the display into parent threads of conversation, while still being able to maintain separate and clearly definable responses to each subdiscussion within the parent thread conversation. As a result, the present invention allows for n-deep subthreads as different topics are discussed.

As mentioned previously, ongoing conversation pane 702 displays a message as a separate thread of conversation based on the user selecting a menu option to start a new topic of discussion. By initiating a new topic of discussion, a tag indicating that the outgoing message is a new topic of discussion is stored in the header information of the outgoing message. When ongoing conversation pane 702 receives the message, the information stored in the header is used to determine how the message is displayed in ongoing conversation pane 702. For example, if the header information contains a tag indicating that the outgoing message is a new topic of discussion, the message is displayed separately from previous topics of conversation in ongoing conversation pane 702. If the header information contains a tag indicating that the outgoing message is part of an existing topic of discussion, the message is displayed within the corresponding existing topic of conversation in ongoing conversation pane 702. If the header information contains a tag indicating that the outgoing message is a new subthread within an existing topic of conversation, the message is displayed within the corresponding existing topic of conversation, but separately from other subdiscussions within the existing topic of conversation in ongoing conversation pane 702.

Figure 8:
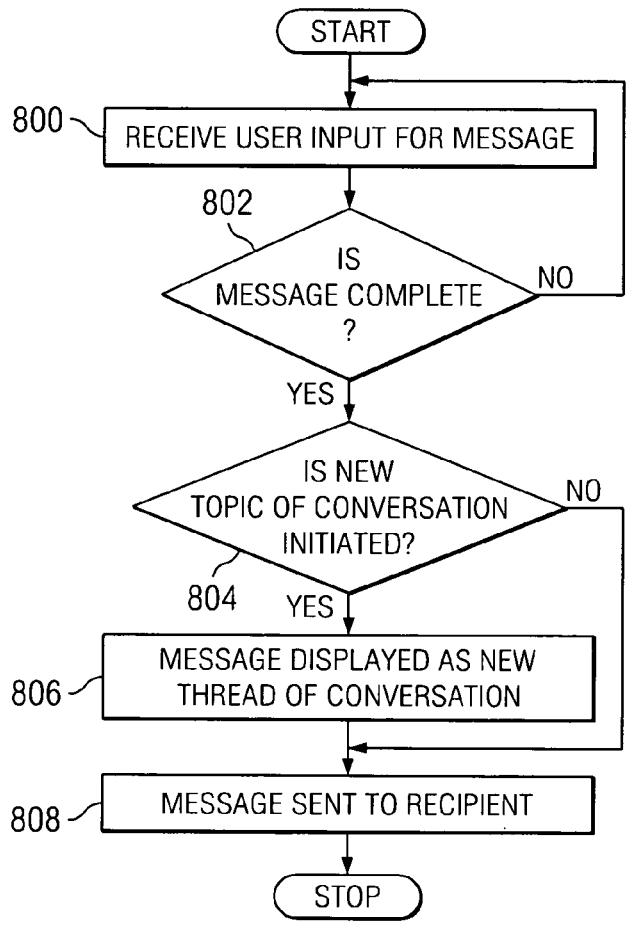
FIG. 8 is a flowchart of a process for managing instant messages in accordance with a preferred embodiment of the present invention.

Turning next to FIG. 8, a flowchart of a process for managing multi-threaded conversations in an instant messaging system is depicted in accordance with a preferred embodiment of the present invention. The process illustrated in FIG. 8 may be implemented in an instant messaging application, such as instant messaging application 500 in FIG. 5.

The process begins by receiving user input for the message (step 800). Next, a determination is made as to whether the message is complete (step 802). If the message is not complete, the process returns to step 800. Otherwise, a determination is made as to whether a new topic of conversation is initiated (step 804). This determination may be made by checking if the user selected the new thread button on the messaging window. If the new topic of conversation has been identified, the message is displayed as a different thread of conversation from the previous topic of conversation (step 806) and sent to the recipient (step 812). Turning back to step 804, if a new topic of conversation is not initiated, a determination is made as to whether the message is part of an existing conversation (step 808). This determination may be made by checking the header information for the message, which may contain a tag indicating the message is part of an existing conversation. If the message is identified as being part of an existing conversation, the message is displayed within the existing thread of conversation (step 810) and sent to the recipient (step 812). Turning back to step 808, if the message is not identified as part of an existing conversation, the process proceeds directly to step 812 without displaying the message within an existing thread of conversation, with the process terminating thereafter.

Thus, the present invention provides an improved method, apparatus, and computer instructions for managing multi-threaded conversations within an instant messaging system. In these examples, conversational threads are organized in a topical manner so that a user receiving an instant message containing a new topic of conversation can visually identify what response is related to what thread of conversation. In this manner, an advantage is provided over chronological messaging digests by managing multi-topical conversations within a single messaging window of an instant messaging session so as to allow communication to proceed more clearly. Further, this new thread of conversation may be created at all other locations for all of the parties involved in the instant messaging session. The present invention provides a menu option in the instant messaging application that allows a user to split a single stream of conscious conversation into multiple threads of conversation, as well as merge one or more of the threaded conversations into a single conversation.

If a participant in the instant message session does not have the capability to display multiple ongoing panes for a discussion thread, an identifier may be displayed on such participant's on going pane to associate the instant message content with the topic being discussed. This allows receiving content for an instant message session where some of the participants have the capability to display multiple discussion panes, and others do not.

If a participant in the instant message session does not have the capability to display multiple outgoing panes for a discussion thread, an identifier may be entered on such participant's outgoing pane to associate the outgoing instant message content with the topic being discussed. This allows sending content for an instant message session where some of the participants have the capability to initiate multiple discussion thread panes, and others do not.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing multi-threaded conversations in an instant messaging session, comprising:
    receiving a first user input identifying an outgoing message as a new conversation thread in the instant messaging session displayed in an instant messaging window, wherein a user and a recipient have exchanged messages in at least one previous conversation thread during the instant messaging session;
    sending the outgoing message to the recipient;
    displaying the sent message segregated from previous conversation threads in a conversation pane of the instant messaging window, wherein the new conversation thread and previous conversation threads are displayed in a same conversation pane of the instant messaging window;
    receiving a second user input comprising selection of a first menu button on the instant messaging window, wherein selection of the first menu button merges conversation threads to form a multi-threaded conversation, and wherein selection of the first menu button displays the merged conversation threads as a single stream of conversation in chronological order in the same conversation pane of the instant messaging window; and
    receiving a third user input comprising selection of a second menu button on the instant messaging window, wherein selection of the second menu button segregates the merged conversation threads from within the multi-threaded conversation, and wherein selection of the second menu button displays the segregated conversation threads as separate topics of conversation in the same conversation pane of the instant messaging window.

2. The method of claim 1, wherein messages in the conversation pane are organized in a tree-like hierarchical format.

3. The method of claim 1, further comprising:
    receiving the sent message at the recipient; and
    displaying the sent message in a conversation pane of the recipient segregated from previous conversation threads in the conversation pane of the recipient, wherein the new conversation thread and previous conversation threads are displayed in the conversation pane of the recipient.

4. The method of claim 1, wherein the outgoing message includes header information containing a new thread identifier.

5. The method of claim 4, wherein the new conversation thread is identified using the header information.

6. The method of claim 1, wherein at least one participant in the instant messaging session has a capability to display multiple conversation threads via multiple panes, and at least another participant in the instant messaging session does not have the capability to display multiple conversation threads via multiple panes.

7. A method for managing multi-threaded conversations in an instant messaging session, comprising:
    receiving a first user input identifying an outgoing message as an existing conversation thread in the instant messaging session displayed in an instant messaging window, wherein a user and a recipient have exchanged messages in at least one previous conversation thread during the instant messaging session;
    sending the outgoing message to a recipient;
    displaying the sent message within an existing conversation thread in a conversation pane of the instant messaging window, wherein the existing conversation thread and other conversation threads are displayed in a same conversation pane of the instant messaging window;
    receiving a second user input comprising selection of a first menu button on the instant messaging window, wherein selection of the first menu button merges conversation threads to form a multi-threaded conversation, and wherein selection of the first menu button displays the merged conversation threads as a single stream of conversation in chronological order in the same conversation pane of the instant messaging window; and
    receiving a third user input comprising selection of a second menu button on the instant messaging window, wherein selection of the second menu button segregates the merged conversation threads from within the multi-threaded conversation, and wherein selection of the second menu button displays the segregated conversation threads as separate topics of conversation in the same conversation pane of the instant messaging window.

8. The method of claim 7, further comprising:
    receiving the sent message at the recipient;
    displaying the sent message within an existing conversation thread in a conversation pane of the recipient.

9. The method of claim 7, wherein the outgoing message includes header information containing a new thread identifier.

10. The method of claim 9, wherein the existing conversation thread is identified using the header information.

* * * * *